No. 803,294. PATENTED OCT. 31, 1905.
C. G. KRANZ.
VELOCIPEDE.
APPLICATION FILED MAR. 29, 1905.

Witnesses:
Kathleen Cornwall
J. E. Sherrey.

Inventor:
Curtis G. Kranz
by Bitner, Niles & Sherrey
Attys.

UNITED STATES PATENT OFFICE.

CURTIS G. KRANZ, OF CHICAGO, ILLINOIS.

VELOCIPEDE.

No. 803,294. Specification of Letters Patent. Patented Oct. 31, 1905.

Application filed March 29, 1905. Serial No. 262,698.

*To all whom it may concern:*

Be it known that I, CURTIS G. KRANZ, a citizen of the United States of America, residing at Chicago, in the county of Cook and State of Illinois, have invented certain new and useful Improvements in Velocipedes, of which the following is a specification.

My invention relates to improvements in velocipedes, and is fully described and explained in this specification and shown in the accompanying drawings, in which—

Figure 1:
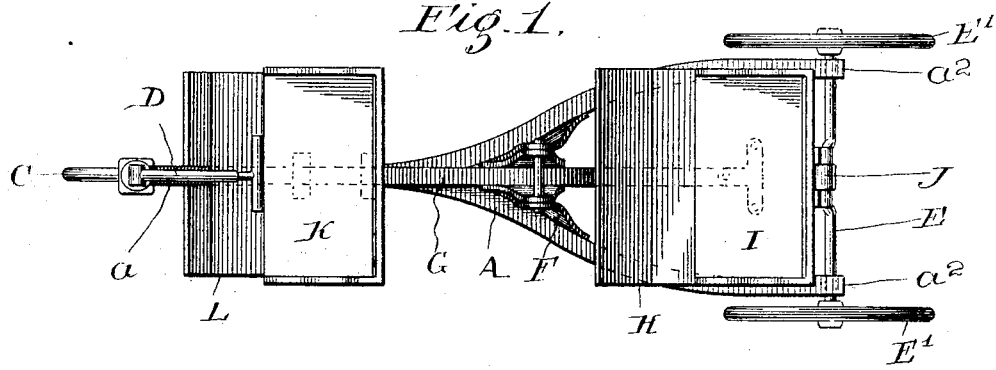
Figure 2:
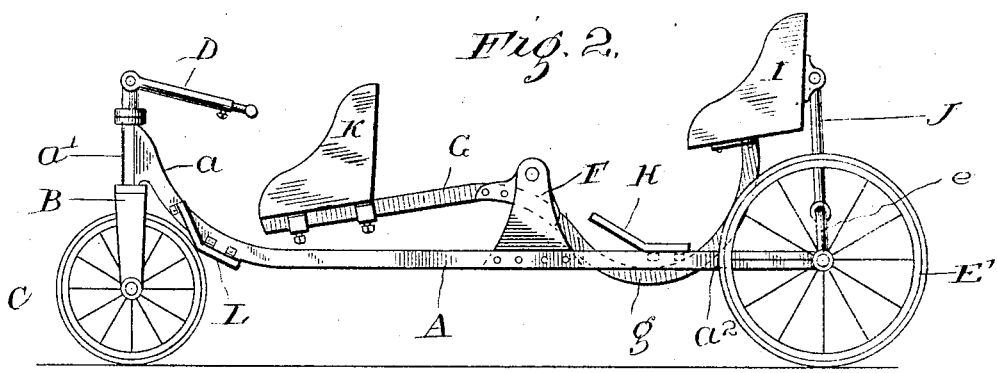
Figure 3:
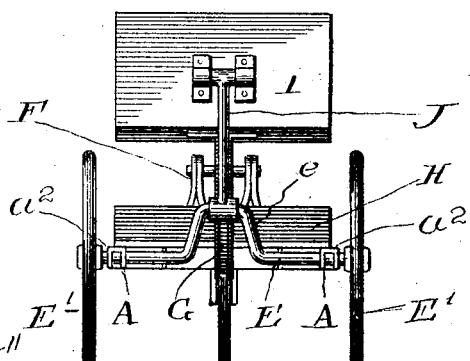

Figure 1 is a top plan of my improved device. Fig. 2 is a side elevation thereof, and Fig. 3 is a rear elevation.

Referring to the drawings, A is a bifurcated frame having a forward central extension $a$, terminating in a head $a'$, and two rear extensions $a^2$.

B indicates a front fork which extends downward from the head $a'$, said fork having journaled at its lower end a wheel C and having at its upper end a pivoted steering-handle D, arranged to swing in the plane of the wheel C. Between the rear ends of the rearwardly-extending member $a^2$ of the frame A is journaled a shaft E, having at its center a crank $e$ and at its ends wheels E'.

Near the center of the frame A is an upwardly-projecting bracket F, in which is pivoted a beam G, having near its rear end a downward curve or yoke $g$, passing under a foot-rest H, secured to the frame A. At the rear end of the beam G is a seat I, connected by a pitman J with the crank $e$ on the shaft E. At the forward end of the beam G is secured a second seat K, and in front of said seat and below the same is a footboard L, secured to the frame.

In operation two persons occupy the seats of my improved device with their feet on the corresponding footboards. The front seat K is longitudinally adjustable on the beam, according to the weight of the two users, until they balance each other, and the handle D, which, it will be noted, is adjustable in length, is arranged to be within easy reach of the passenger on the front seat. Thereupon the device can be propelled forward if the passengers will press downward on the corresponding footboards alternately, the beam meanwhile reciprocating on its pivot, so that a seesaw motion is obtained in addition to the forward one, the oscillatory motion of the beam being transmitted to a rotary motion of the shaft E by the pitman and crank.

I realize that considerable variation is possible in the details of this construction without departing from the spirit of the invention, and I therefore do not intend to limit myself to the specific form herein shown and described.

I claim as new and desire to secure by Letters Patent—

In a device of the class described, the combination with a frame and wheels supporting the same, of a beam pivoted between its ends to the frame, a downward curve in the rear portion of the beam, a footboard secured to the frame, under which said curve passes, seats secured to the ends of the beam and means of connection between the beam and the wheels.

In witness whereof I have signed the above application for Letters Patent, at Chicago, in the county of Cook and State of Illinois, this 25th day of March, A. D. 1905.

CURTIS G. KRANZ.

Witnesses:
   CHAS. O. SHERVEY,
   KATHLEEN CORNWALL.